US005567082A

United States Patent [19]
Ball et al.

[11] Patent Number: 5,567,082
[45] Date of Patent: Oct. 22, 1996

[54] FASTENING ARRANGEMENTS

[75] Inventors: Craig E. Ball; David J. Oliver, both of Preston, United Kingdom

[73] Assignee: British Aerospace Public Limited Company, Farnborough, United Kingdom

[21] Appl. No.: 339,154

[22] Filed: Nov. 10, 1994

[30] Foreign Application Priority Data

Nov. 10, 1993 [GB] United Kingdom ............... 9323156

[51] Int. Cl.⁶ ............................................. F16B 21/00
[52] U.S. Cl. ........................ 403/407.1; 403/405.1; 403/7; 403/19; 411/108
[58] Field of Search ..................... 403/13, 19, 20, 403/21, 6, 7, 405.1, 406.1, 407.1; 411/111, 112, 113, 108, 82, 258, 180

[56] References Cited

U.S. PATENT DOCUMENTS

| | | | |
|---|---|---|---|
| 1,356,835 | 10/1920 | Spiro | 411/108 |
| 2,861,825 | 11/1958 | Abrams et al. | 403/20 |
| 3,180,387 | 4/1965 | Dzus et al. | 411/111 |
| 3,678,981 | 7/1972 | Heyworth. | |
| 3,785,421 | 1/1974 | Launay | 411/108 |
| 4,863,326 | 9/1989 | Vickers | 403/407.1 X |
| 5,080,546 | 1/1992 | Purvin et al. | |

FOREIGN PATENT DOCUMENTS

| | | |
|---|---|---|
| 754999 | 8/1956 | United Kingdom. |
| 1139257 | 1/1969 | United Kingdom. |
| 1231723 | 5/1971 | United Kingdom. |
| 1349200 | 3/1974 | United Kingdom. |
| 2060806 | 5/1981 | United Kingdom. |
| WO81/00896 | 4/1981 | WIPO. |

Primary Examiner—Anthony Knight
Attorney, Agent, or Firm—Cushman, Darby & Cushman

[57] ABSTRACT

A fastening arrangement for connecting two items comprises a stud 16 secured to one item 14 and a captive fastener 18 located in a fastener body 20 secured to the other item. The captive fastener 18 is made up of a nut 32, a washer 34 and an outer clip 36 for securing the nut to the clip. The nut, washer and clip 36 may all be passed though the access opening 30 in the fastener body when separate, but when assembled, they resist withdrawal.

12 Claims, 1 Drawing Sheet

FASTENING ARRANGEMENTS

BACKGROUND OF THE INVENTION

This invention relates to captive fastening arrangements.

Such arrangements are commonly used in applications, e.g. on aircraft, where a loose fastener such as a nut could cause severe damage. Captive fastenings may also simplify assembly and maintenance components. For example a rectangular panel may be provided with captive nut assemblies at each corner which are screwed onto studs on an underlying structure. Where a large degree of float is required between the captive fastener and the fastener body, existing arrangements may not provide a satisfactory solution. A requirement for a large degree of float may also make initial engagement of the cooperating fastening elements problematic. The embodiment described herein provides a fastening with relatively large float, captive parts, and relatively easy location between the cooperating elements due to a degree of self alignment between the parts.

British Patents Nos. 1,139,257 and 1,231,723 each show arrangements in which an internally threaded component is held captive within a recess and is prevented from rotating. This type of arrangement requires a loose bolt to be screwed into the nut and is not suitable for use with a fixed bolt or threaded stud which require that the nut be engaged by a tool and rotated to run it down the bolt or stud. Also, the need in the earlier arrangements to prevent rotation of the nut means that the nut is not capable of float relative to the bolt or stud and so any tolerance must be provided by the loose bolt or stud. Further, the use of a loose bolt defies the principle of a captive fastening.

SUMMARY OF THE INVENTION

According to one aspect of this invention, there is provided a fastening arrangement for connecting two items together, said arrangement comprising a first connector means associated with one of said items and a second connector means housed generally within a recess provided in the other of said items or a fastener body attached thereto, said recess defining an aperture for allowing said first and second connector means to be engaged, and an access opening, said second connector means being made up of a plurality of parts which may be passed separately through said access opening and assembled in said recess but which, when assembled, resists withdrawal through said opening, and wherein said second connector means is capable of rotation within said recess.

The first and second connector means may take many different forms, such as a push fit, a bayonet fitting and so on but it is preferred for the first connector means to comprise a threaded male member and the second connector means to comprise a threaded female member.

The second connector means preferably includes an internally threaded element and a resiliently deformable outer retaining element of diameter greater than that of said access aperture, for being connected to said internally threaded element. Advantageously, said second connector means further includes washer means, said outer retaining element being operable to clip together said washer means and said internally threaded element.

Said internally threaded element is preferably provided with a flared surface to provide a lead into the threaded part. Said washer means may also include a flared surface which cooperates with the flared surface on said internally threaded element to provide a lead into the threaded part.

Preferably, the external dimension of the second connector means, the internal dimension of the recess, and the extent of said flared surfaces, are such that at least part of the said flared surface is accessible to the first connector means through said aperture.

In another aspect, this invention provides a captive nut arrangement including means defining a recess having a tool access opening and a threaded member access aperture, and a captive nut assembly disposed within said recess, said captive nut assembly comprising an internally threaded element and a retaining element for being attached to said internally threaded element, wherein the recess, said internally threaded element and said retaining element are dimensioned so that, when separate, the internally threaded element and the retaining element may be passed through at least one of the access opening and the access aperture, but when attached together within said recess, said elements resist withdrawal therefrom, and so that said nut assembly may be engaged with a tool via said tool access opening and rotated to assist threaded engagement in use with a threaded male member.

In a further aspect, this invention provides a panel assembly comprising a panel element releasably secured to an underlying structure provided with two or more threaded members projecting therefrom, said panel element being provided at positions corresponding to said two or more threaded members with respective captive nut arrangements each including means defining a recess having a tool access opening and a threaded member access aperture, and a captive nut assembly disposed within said recess, said captive nut assembly comprising an internally threaded element and a retaining element for being attached to said internally threaded element, wherein the recess, said internally threaded element and said retaining element are dimensioned so that, when separate, the internally threaded element and the retaining element may be passed through at least one of the access opening and the access aperture, but when attached together within said recess, said elements resist withdrawal therefrom, and so that said nut assembly may be engaged with a tool via said tool access opening and rotated to assist threaded engagement in use with a threaded male member.

Whilst the invention has been defined above, it includes any inventive combination or subcombination of features set out in the description or claims.

BRIEF DESCRIPTION OF THE DRAWINGS

The invention may be performed in many ways and an embodiment thereof will now be described in detail, reference being made to the accompanying drawings, in which.

DETAILED DESCRIPTION OF THE PRESENTLY PREFERRED EXEMPLARY EMBODIMENT

Figure 1:
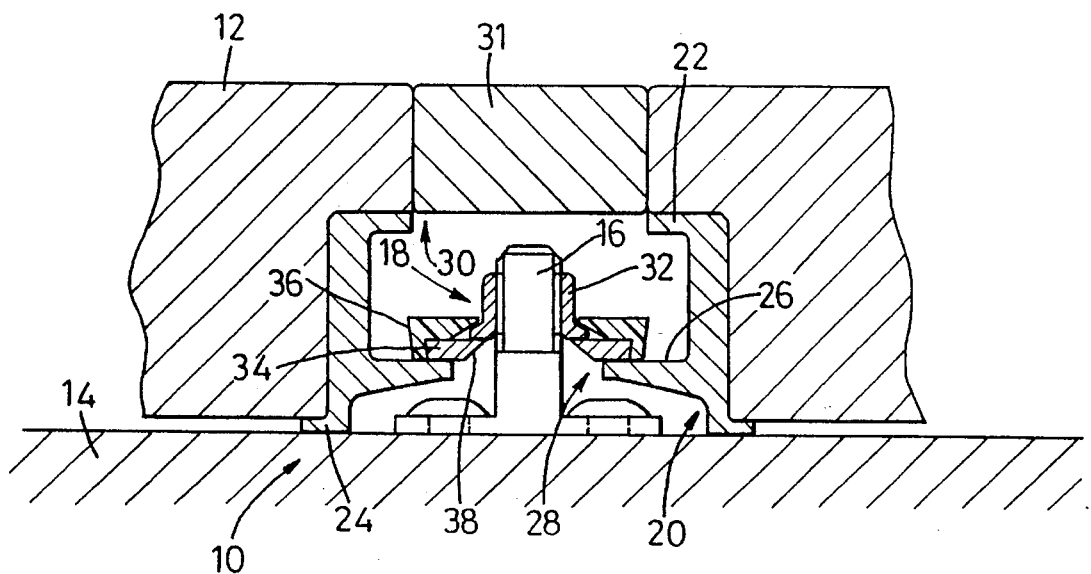
FIG. 1 is a sectional view of a fastening arrangement in accordance with the invention.
Figure 2:
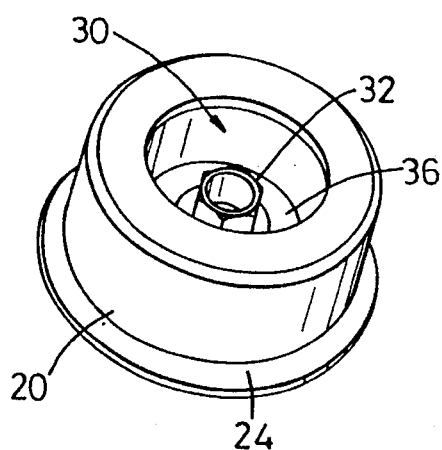
FIG. 2 is a perspective view from above of part of the arrangement of FIG. 1.
Figure 3:
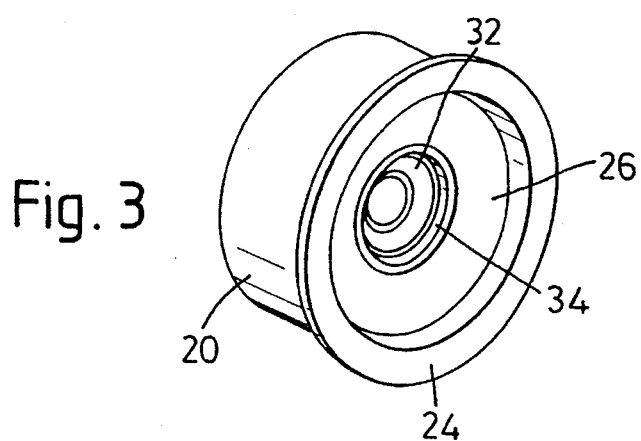
FIG. 3 is a perspective view from below of part of the arrangement of FIG. 1.

The arrangement 10 illustrated in the drawings secures together two items, here a detectability shielding material 12 in the form of a moulded rigid foam, and a mounting structure 14. A first connector means, here a threaded stud 16, is attached to the mounting structure 14, and a second connector means 18 or captive nut assembly is located within the recess of a fastener body 20. The fastener body 20 is of generally cylindrical form and bonded within a stepped bore 22 in the shielding material 12. The body 20 includes an annular foot 24 which is urged into engagement with the mounting structure 14 and which defines a clearance gap between the structure 14 and the material 12 to prevent compression and damage of the material 12. Internally the body 20 is provided with a flange 26 which defines an aperture 28 through which the stud 16 passes. The aperture 28 is of substantially greater diameter than the stud 16 to provide generous radial float. At its upper end as viewed in FIG. 1, the body 20 is provided with an access opening 30, which is closed by a plug 31, once the fastener has been done up.

The second connector means 10 is made up of three interconnected components namely a nut 32, a washer 34 and an outer clip 36 or retaining element of resiliently deformable material such as Nylon (™) or other plastics material which can be passed over the nut 32 and then clipped over the outer edge of the washer 34. The stud 16, nut 32 and washer 34 are typically of metal such as stainless steel but could be of other material.

During assembly, the nut 32 and washer 34 can pass through the access opening 30 without difficulty. The outer clip 36 has a slightly greater diameter than the access opening 30, but being generally disc-shaped and of resiliently deformed material can be temporarily resiliently deformed to pass through the opening when separate. However, once the clip 36 has been passed over the nut 32 and clipped around the washer 34, it loses much of its ability to deform and so the assembled second connector means 18 cannot pass back through the access opening unless reduced to its component parts.

The lower end of the bore of the nut 32, and the adjacent parts of the washer are flared as seen at 38 to provide a lead into the thread of the nut and to allow a misaligned nut to be assembled on a blind stud. Once assembled with the washer 34 and the clip 36, the nut 32 can be screwed and unscrewed using a spanner or socket drive via the access opening 30. Even when the assembled nut 32 is right at the edge of the recess, the flared part 38 is still accessible through the aperture 28 and so assembling a panel blind onto an underlying structure is made much easier due to the high degree of self aligning of the nuts with the studs.

We claim:

1. A fastening arrangement for connecting two items together, said arrangement comprising:

a first connector means associated with one of said items, and a second connector means housed substantially wholly within a fastener recess provided in the other of said items, said fastener recess defining an aperture for allowing said first and second connector means to be engaged, and an access opening spaced axially from said aperture, and said second connector means being made up of a plurality of parts which may be passed separately through said access opening and clipped together in said recess but which, when clipped together, are contained within said fastener recess and resist withdrawal through said opening, and wherein said second connector means is capable of rotation within said recess to allow secure connection of said first and said second connector means.

2. An arrangement according to claim 1, wherein said first connector means includes a threaded male member and said second connector means includes an internally threaded element.

3. An arrangement according to claim 2, wherein said second connector means further includes a resiliently deformable outer retaining element of diameter greater than that of said access aperture constructed and arranged to be connected to said internally threaded element.

4. An arrangement according to claim 3, wherein said second connector means further includes washer means, said outer retaining element being operable to clip together said washer means and said internally threaded element.

5. An arrangement according to claim 4, wherein said internally threaded element is provided with a flared surface to provide a lead into the threads thereof.

6. An arrangement according to claim 5, wherein said washer means includes a flared surface which cooperates with the flared surface on said internally threaded element to provide a lead into the threads of the threaded element.

7. An arrangement according to claim 5, wherein the external dimension of the second connector means, the internal dimension of the recess, and the extent of said flared surfaces are such that at least part of at least one of said flared surfaces is accessible to the first connector means through said aperture.

8. A captive nut arrangement including means defining a recess having a tool access opening and a threaded member access aperture, and a captive nut assembly disposed within said recess, said captive nut assembly comprising an internally threaded element and a retaining element for being attached to said internally threaded element, wherein the recess, said internally threaded element and said retaining element are dimensioned so that, when separate, the internally threaded element and the retaining element may be passed through at least one of the access opening and the access aperture, but when attached together within said recess, said elements resist withdrawal therefrom, and so that said nut assembly may be engaged with a tool via said tool access opening and rotated to assist threaded engagement in use with a threaded male member.

9. A captive nut arrangement according to claim 8, wherein said recess defining means comprises a generally cylindrical housing for being attached to a structural item.

10. A captive nut arrangement according to claim 9, wherein said housing includes an internal annular flange bounding one end region of said recess and defining said threaded member access aperture, the surface of said flange remote from said recess being flared or tapered to tend to direct in use a threaded member towards and through said access aperture.

11. A panel assembly comprising a panel element releasably secured to an underlying structure provided with two or more threaded members projecting therefrom, said panel element being provided at positions corresponding to said two or more threaded members with respective captive nut arrangements including means defining a recess having a tool access opening and a threaded member access aperture, and a captive nut assembly disposed within said recess, said captive nut assembly comprising an internally threaded element and a retaining element for being attached to said internally threaded element, wherein the recess, said internally threaded element and said retaining element are dimensioned so that, when separate, the internally threaded element and the retaining element may be passed through at least one of the access opening and the access aperture, but when attached together within said recess, said elements resist withdrawal therefrom, and so that said nut assembly may be engaged with a tool via said tool access opening and rotated to assist threaded engagement in use with a threaded male member.

12. A panel assembly according to claim 11 wherein each recess defining means comprises a generally cylindrical housing secured within a respective bore within said panel means, and wherein said tool access opening is accessible from the side of the panel element remote from the underlying structure.

* * * * *